United States Patent
Lee et al.

(10) Patent No.: US 10,354,616 B2
(45) Date of Patent: Jul. 16, 2019

(54) DISPLAY DEVICE AND LUMINANCE CORRECTION METHOD OF THE SAME

(71) Applicant: SAMSUNG DISPLAY CO., LTD., Yongin-si, Gyeonggi-do (KR)

(72) Inventors: Su Mi Lee, Yongin-si (KR); Sang Ho Kim, Yongin-si (KR); Jong Ho Chong, Yongin-si (KR); Young Sang Ha, Yongin-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 71 days.

(21) Appl. No.: 15/585,683

(22) Filed: May 3, 2017

(65) Prior Publication Data

US 2017/0323619 A1 Nov. 9, 2017

(30) Foreign Application Priority Data

May 9, 2016 (KR) .................... 10-2016-0056571

(51) Int. Cl.
*G09G 5/10* (2006.01)
*G09G 5/14* (2006.01)

(52) U.S. Cl.
CPC .............. *G09G 5/10* (2013.01); *G09G 5/14* (2013.01); *G09G 2320/0233* (2013.01); *G09G 2320/066* (2013.01); *G09G 2320/0686* (2013.01); *G09G 2360/14* (2013.01); *G09G 2360/145* (2013.01); *G09G 2360/16* (2013.01)

(58) Field of Classification Search
CPC .... G09G 5/10; G09G 5/14; G09G 2320/0233; G09G 2320/0686; G09G 2360/145; G09G 2360/16; G09G 2320/0626; G09G 2320/04; G09G 2320/062; G09G 2320/0646; G09G 2320/066; G09G 2360/144; G09G 2360/14; G09G 2360/141; G09G 2360/00; G09G 2320/0266; G09G 2320/00; G09G 2320/02; G09G 2320/0209
See application file for complete search history.

(56) References Cited

U.S. PATENT DOCUMENTS

| | | | |
|---|---|---|---|
| 8,665,298 B2 | 3/2014 | Hong et al. | |
| 2008/0297695 A1* | 12/2008 | Sekiguchi | G02B 6/0038 349/65 |
| 2014/0240201 A1* | 8/2014 | Takahashi | G06F 3/1446 345/1.3 |
| 2016/0063954 A1 | 3/2016 | Ryu | |

FOREIGN PATENT DOCUMENTS

| | | | | |
|---|---|---|---|---|
| EP | 3357734 A1 * | 8/2018 | ............. | B60K 35/00 |
| JP | 2009204824 A * | 9/2009 | | |
| KR | 10-1327883 B1 | 11/2013 | | |
| KR | 10-1530788 B1 | 6/2015 | | |
| KR | 10-2016-0019341 A | 2/2016 | | |
| KR | 1020160019341 A * | 2/2016 | | |
| KR | 10-2016-0026628 A | 3/2016 | | |
| WO | WO-2014027569 A1 * | 2/2014 | ......... | G02F 1/13338 |

* cited by examiner

*Primary Examiner* — Julie Anne Watko
(74) *Attorney, Agent, or Firm* — Lee & Morse, P.C.

(57) ABSTRACT

A display device includes a display unit including a plurality of pixels to display a display image, a luminance detector to detect luminance of an image on the display unit, and a display driver. The display divider is to divide the display unit into image areas symmetrical to each other and to adjust a luminance of an image area having a relatively lower luminance value among the image areas symmetrical to each other based on a luminance detection result.

16 Claims, 7 Drawing Sheets

| RL [%] | RD [%] | Yl[Cd/m$^2$] | Yref[Cd/m$^2$] |
|---|---|---|---|
| 4.5 | 10 | 40 | 30 |
| 6 | 20 | 40 | 20 |
| ⋮ | ⋮ | ⋮ | ⋮ |

LUT

FIG. 9

DISPLAY DEVICE AND LUMINANCE CORRECTION METHOD OF THE SAME

CROSS-REFERENCE TO RELATED APPLICATION

Korean Patent Application No. 10-2016-0056571, filed on May 9, 2016, in the Korean Intellectual Property Office, and entitled: "Display device and Luminance Correction Method of the same," is incorporated by reference herein in its entirety.

BACKGROUND

1. Field

One or more embodiments described herein relate to a display device and a luminance correction method of the same.

2. Description of the Related Art

Electronic devices called wearable devices that can be worn on the body have been actively developed. Among these electronic devices, a head mounted display (HMD) device refers to an imaging device that displays an image in front of a user in a virtual reality or an augmented reality system. The HMD device may be a safety goggle or a helmet.

The HMD device may include a display unit having a light-weight display panel for displaying an image, a display driver for controlling the display unit, and an optical system, e.g., a lens, and the like for controlling an image generated from the display unit to be recognized as a virtual image distant from the user by a predetermined distance.

SUMMARY

In accordance with one or more embodiments, a display device may include a display unit including a plurality of pixels to display a display image; a luminance detector to detect luminance of an image on the display unit; and a display driver. The display driver may divide the display unit into image areas symmetrical to each other and to adjust a luminance of an image area having a relatively lower luminance value between the image areas symmetrical to each other based on a luminance detection result.

According to an embodiment, the display device may further include a lens unit including a lens focusing the image on an eyeball of a user.

The image may include the display image and a second image reflected by the lens.

The display driver may divide the image into the image areas that are symmetrical to each other about an optical axis of the lens.

The display driver may calculate a luminance difference between a first luminance of a first image area and a second luminance of a second image area symmetrical to the first image area among the image areas and adjust the second luminance having a lower luminance value than the first luminance to adjust the luminance difference to a value smaller than or equal to a reference luminance difference included in a look-up table.

The display driver may gradually increase the second luminance so that the second luminance decreases toward a center of symmetry in the second area.

The display driver may increase the second luminance of the second image area.

The reference luminance difference may be set to correspond to reflectivity of the lens.

The reference luminance difference may be set to correspond to reflectivity of the display unit.

The look-up table may include reflectivity of the display unit, reflectivity of the lens and the reference luminance difference.

The display driver may adjust luminances of the image areas so that luminance differences between image areas symmetrical to each other are less than a reference luminance difference.

A method of correcting luminance of a display device may include detecting luminance of an image on a display unit, dividing the image into image areas symmetrical to each other, calculating a luminance difference between the image areas; and adjusting a luminance of an image area having a relatively lower luminance value among the image areas symmetrical to each other based on the luminance difference.

Dividing the image may include dividing the image into the image areas that are symmetrical to each other about an optical axis of a lens focusing the image on an eyeball of a user.

The image areas may include a first image area in which the display image is displayed having a first luminance and a second image area having a second luminance, less than the first luminance Adjusting the second luminance may include gradually increasing the second luminance so that the second luminance increases away from a center of symmetry.

Adjusting of the second luminance may include increasing the second luminance in an entirety of the second image area.

Adjusting the luminance may include adjusting the luminances so that luminance differences between image areas symmetrical to each other are less than a reference luminance difference.

The reference luminance difference may be stored in a look-up table that includes reflectivity of the display unit, reflectivity of a lens focusing the visual image on an eyeball of a user, and the reference luminance difference.

BRIEF DESCRIPTION OF THE DRAWINGS

Features will become apparent to those of skill in the art by describing in detail exemplary embodiments with reference to the attached drawings in which.

DETAILED DESCRIPTION

Specific structural or functional descriptions for embodiments disclosed herein are merely illustrative for purposes of illustrating embodiments in accordance with the concepts of the present disclosure. The embodiments may be embodied in various forms and are not limited to the embodiments described herein.

Embodiments of the present disclosure may make various changes and have various forms, so that the embodiments are illustrated in the drawings and described in detail herein. However, it should be understood that the disclosure is not limited to the specific embodiments thereof, and various changes, equivalences and substitutions may be made without departing from the scope and spirit of the disclosure.

The terms first, second, or the like may be used to describe various elements, but the elements should not be limited by the terms. The terms are intended to distinguish one element from another, for example, without departing from the scope of the disclosure in accordance with the concepts of the present disclosure, the first constituent element may be named the second constituent element and the second constituent element may also be referred to as the first constituent element.

The terms used in the application are merely used to describe particular exemplary embodiments, and are not intended to limit the disclosure. Singular forms in the disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, exemplary embodiments will be described in detail with reference to the accompanying drawings.

Figure 1:
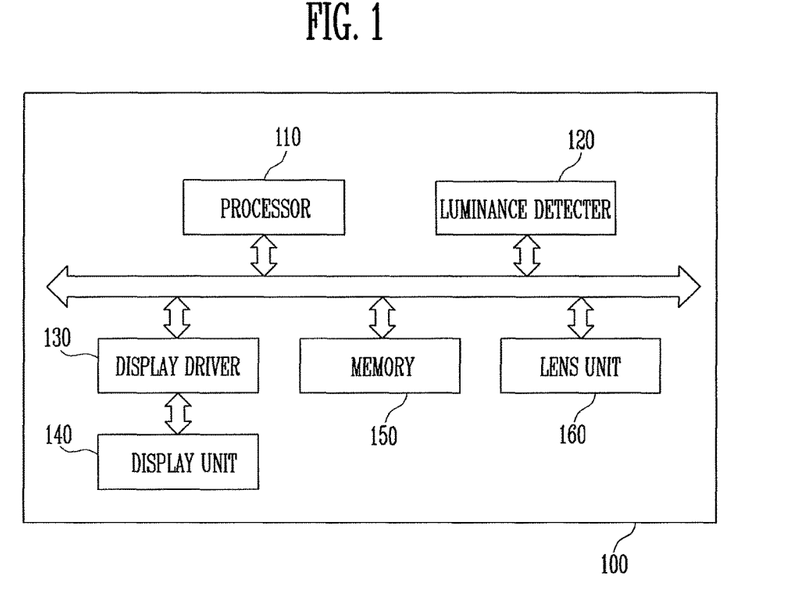
FIG. 1 illustrates a schematic block view of a display device according to an embodiment of the present disclosure.

FIG. 1 is a schematic block view illustrating a display device according to an embodiment of the present disclosure. Referring to FIG. 1, a display device 100 according to an embodiment of the present disclosure may include a processor 110, a luminance detector 120, a display driver 130, a display unit 140, a memory 150, and a lens unit 160. According to an embodiment, the display device 100 may be embodied as a wearable display device, e.g., a head mounted display (HMD) device, but the present disclosure is not limited thereto.

The processor 110 may perform predetermined calculations or tasks. For example, the processor 110 may be embodied as an integrated circuit (IC), an application processor (AP), a mobile AP, or a processor capable of controlling an operation of the display driver 130, but the present disclosure is not limited thereto.

The luminance detector 120 may measure luminance of a visual image displayed on the display unit 140. That is, the luminance detector 120 may detect not only a displayed image displayed by the display unit 140, but also luminance of a reflected image generated on the display unit 140 when the displayed image is reflected by a lens back onto the display unit 140. The visual image indicates a combined image including the displayed image and the reflected image.

The display driver 130 may supply a control signal and image data to the display unit 140. That is, the display driver 130 may control the display unit 140 for displaying an image.

The display unit 140 may include a plurality of pixels and may display an image by using image data input from the display driver 130. For example, the display unit 140 may be embodied as an organic light emitting display panel, a liquid crystal display panel, a plasma display panel, and the like, but the present disclosure is not limited thereto.

The memory 150 may store a look-up table required when the display driver 130 corrects luminance of the image data. According to an embodiment, the memory 150 may be embodied as a non-volatile memory such as an electrically erasable programmable read-only memory (EEPROM), a flash memory, a magnetic RAM (MRAM), a spin-transfer torque MRAM, a ferroelectric RAM (FeRAM), a phase change RAM (PRAM), a resistive RAM (RRAM), and like, or a volatile memory such as random access memory (RAM), a static RAM (SRAM), a dynamic RAM (DRAM), a synchronous DRAM (SDRAM), a thyristor RAM (T-RAM), a zero capacitor RAM (Z-RAM), a twin transistor RAM (TTRAM), and the like, but the present disclosure is not limited thereto.

The lens unit 160 may include a lens for focusing the image displayed on the display unit 140 on an eyeball of a user.

Figure 2:
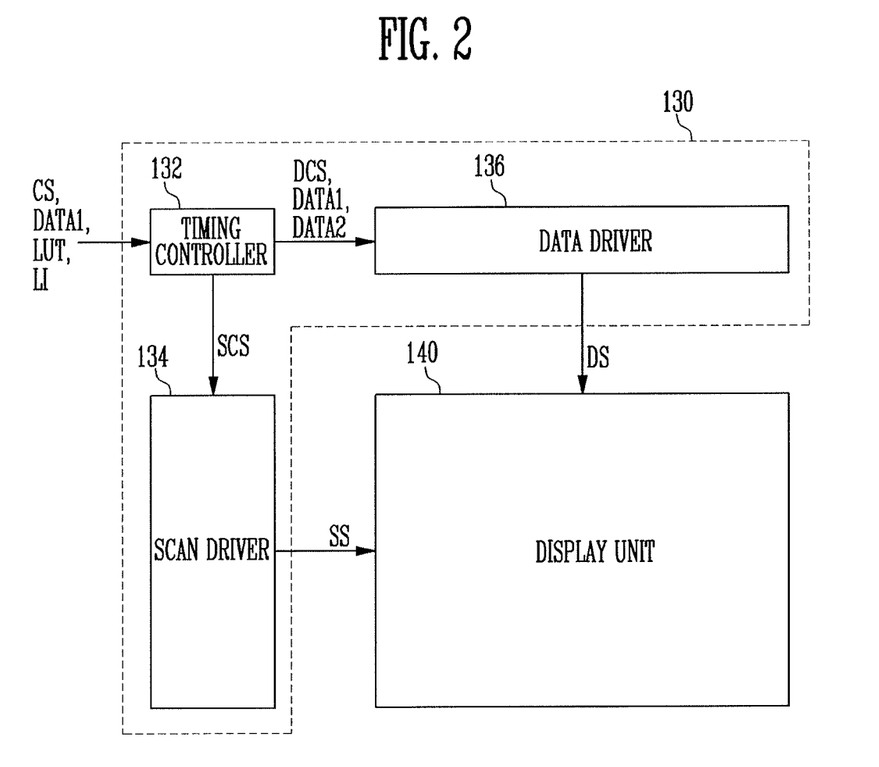
FIG. 2 illustrates a schematic block view of a display driver and a display unit shown in FIG. 1.

FIG. 2 is a schematic block view illustrating a display driver and a display unit shown in FIG. 1. Referring to FIGS. 1 and 2, the display driver 130 may include a timing controller 132, a scan driver 134, and a data driver 136.

The timing controller 132 may receive a control signal CS and first image data DATA1 supplied from the processor 110, a look-up table LUT supplied from the memory 150, and a luminance detection result LI supplied from the luminance detector 120.

The timing controller 132 may generate second image data DATA2 by correcting the first image data DATA1 to adjust luminance of the image displayed on the display unit 140. Specifically, the timing controller 132 may divide the visual image recognized on the display unit 140 into image areas symmetrical to each other and control luminance of an image area having a relatively lower luminance value between the image areas symmetrical to each other in accordance with the luminance detection result LI. According to an embodiment, the timing controller 132 may divide the visual image so that the image areas are symmetrical to each other relative to an optical axis of the lens.

Since the combined image includes the reflected image, a user may see the reflected image as a stain or a residual image. Accordingly, the timing controller 132 according to the embodiment of the present disclosure may control luminance of an image area including the reflected image so that the reflected image may not be viewed by the user.

A reflected image may also be included in an image area (hereinafter, referred to as a first image area) having a relatively higher luminance value between the image areas symmetrical to each other, but the reflected image may be less likely to be viewed by the user than a reflected image included in an image area (hereafter, referred to as a second image area) having a relatively lower luminance value. In particular, a reflected image created from reflection from a first surface of the lens unit 160, e.g., a surface closest the display unit 140, may be in the first image area, but may actually be partially superimposed on the displayed image, so may be less distracting to a user. In contrast an reflected image created from second surface of the lens unit 160, e.g., a surface opposite the first surface, may be in the second image area, so may be more distracting to a viewer.

Accordingly, the display device 100 according to the embodiment of the present disclosure may adjust the luminance of the second image area rather than that of the first image area between symmetrical image areas to prevent the user from visually recognizing the reflected image from in the second image area, e.g., the reflected image from the second surface of the lens unit 160. Additionally or alternatively, the display device 100 according to the embodiment of the present disclosure may adjust the luminance of the first image area.

The timing controller 132 may adjust a luminance difference between the first image area and the second image area by using the look-up table LUT and the luminance detection result LI. The look-up table LUT may include a reference luminance difference set to correspond to at least one of reflectivity of the display unit 140 and reflectivity of the lens.

Specifically, the timing controller 132 may calculate the luminance difference between the first image area and the second image area by using the luminance detection result LI and adjust the luminance of the second image area to adjust the luminance difference to a value smaller than or equal to a reference luminance difference included in the look-up table LUT.

When the luminance difference between the first image area and the second image area is smaller than or equal to the reference luminance difference, the reflected image included in the second image area may not be seen by the user. According to an embodiment, the timing controller 132 may gradually adjust the luminance of the second image area so that a luminance of the second image area may decrease toward a center of symmetry between the first image area and the second image area, e.g., where the first and second image areas are adjacent. According to another embodiment, the timing controller 132 may entirely adjust luminance of the entire second image area.

When the luminance difference between the first image area and the second image area is greater than the reference luminance difference, the timing controller 132 may supply the second image data DATA2 generated by adjusting the luminance of the second image area to the data driver 136. When the luminance difference between the first image area and the second image area is smaller than or equal to the reference luminance difference, the timing controller 132 may supply the first image data DATA1 to the data driver 136.

In addition, the timing controller 132 may generate timing control signals for controlling the scan driver 134 and the data driver 136 on the basis of the control signal CS. For example, the timing controller 132 may generate a scan timing control signal SCS for controlling the scan driver 134 and a data timing control signal DCS for controlling the data driver 136.

The data driver 136 may receive one of the data timing control signal DCS or the first and second image data DATA1 and DATA2 from the timing controller 132 to generate a data signal DS. That is, the data driver 136 may generate the data signal DS on the basis of the first image data DATA1 or the second image data DATA2.

The data driver 136 may supply the generated data signal DS to the display unit 140. The scan driver 134 may supply a scan signal SS to the display unit 140 on the basis of the scan timing control signal SCS.

Pixels of the display unit 140 may receive the data signal DS when the scan signal SS is supplied. Each of the pixels may emit light of luminance corresponding to the received data signal DS.

Figure 3:
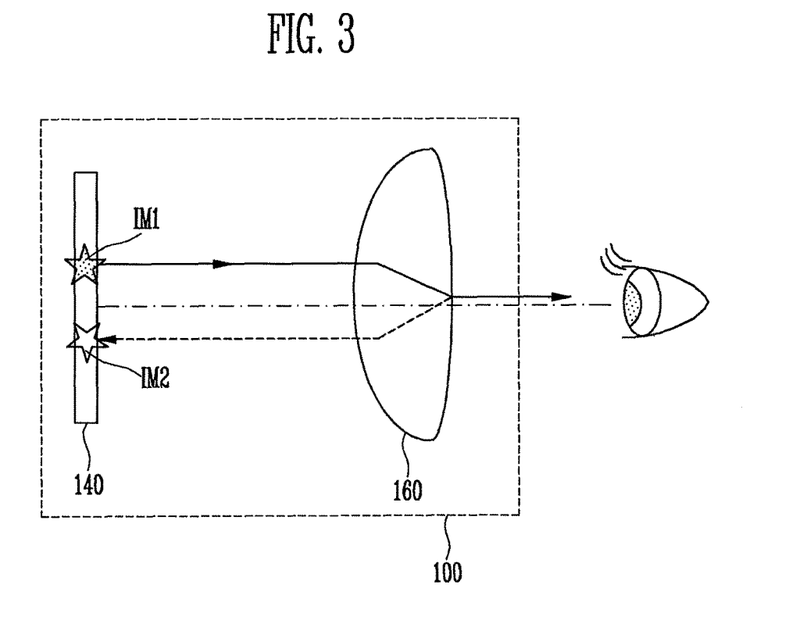
FIG. 3 illustrates is a conceptual view of a display device according to an embodiment of the present disclosure.

FIG. 3 is a conceptual view illustrating a display device according to an embodiment of the present disclosure. Referring to FIG. 3, the display unit 140 may display a first or displayed image IM1 corresponding to the data signal DS. A lens of the lens unit 160 may focus the first image IM1 and provide the eyeball of the user with the focused first image IM1.

The first image IM1 may not entirely pass through the lens, e.g., a portion of the first image IM1 may be reflected at a reflection surface of the lens. Here, only the reflection at the second surface is illustrated for clarity. A reflected image of the first image IM1 propagates in a direction other than the eyeball of the user according to a refractive index of the lens, e.g., back towards the display unit 140.

When the reflected image is incident on the display unit 140, a second or reflected image IM2 may be generated that overlaps, e.g., temporally overlaps, the displayed image on the display unit 140, e.g., may be viewed at the same time as the displayed image by a user. When the reflected image IM2 is focused on the eyeball of the user through the lens, the user may see an image that includes the first image IM1 and the reflected image IM2.

Therefore, although the reflected image IM2 is generated by the reflective image, the display device 100 according to the embodiment of the present disclosure may adjust the luminance of an area in the display unit 140 on which the reflected image IM2 is incident so that the user may not view the reflected image IM2.

Figure 4A:
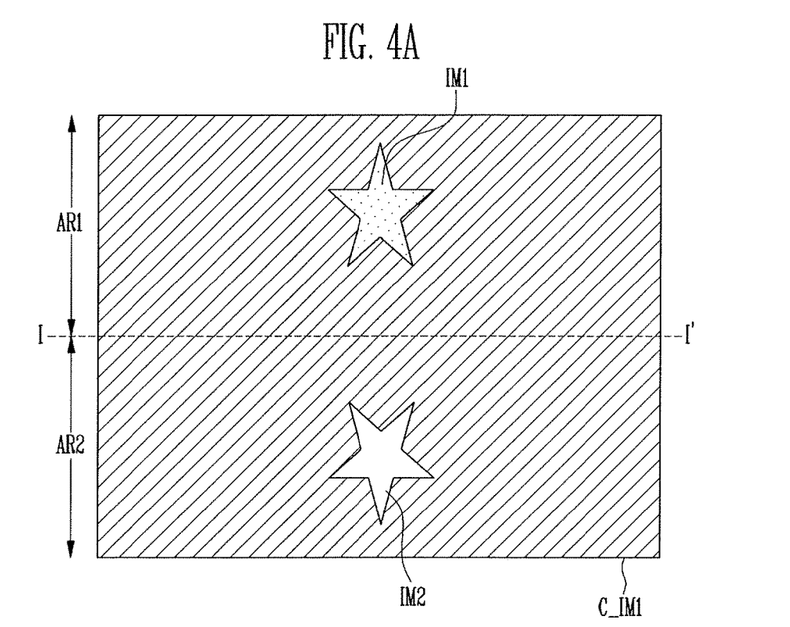
FIGS. 4A and 4B illustrate conceptual views of a luminance correction method of a display device according to an embodiment of the present disclosure.

FIGS. 4A and 4B are conceptual views illustrating a luminance correction method of a display device according to an embodiment of the present disclosure. Referring to FIGS. 2, 3 and 4A, a visual image C_IM1 including the first image IM1 displayed by the display unit 140 and the reflected image IM2 is shown.

In order to adjust luminance of an image area including the reflected image IM2, the timing controller 132 may divide the visual image C_IM1 into a first image area AR1 and a second image area AR2 symmetrical to each other about a center of symmetry I-I'. The timing controller 132 may compare luminance of the first image area AR1 with luminance of the second image area AR2 by using the luminance detection result LI and determine that the reflected image IM2 is included in the image area having a relatively lower luminance value, thereby determining whether to adjust the luminance of an image area having a low luminance value.

For example, when the second image area AR2 has a lower luminance value than the first image area AR1, the timing controller 132 may determine that the reflected image IM2 is in the second image area AR2 and determine whether to adjust the luminance of the second image area AR2. In particular, when a luminance difference between the first image area AR1 and the second image area AR2 has a lower value than the reference luminance difference, the timing controller 132 may determine that the reflected image IM2 included in the second image area AR2 may not be viewed by the user and may not adjust the luminance of the second image area AR2.

However, when the luminance difference between the first image area AR1 and the second image area AR2 has a greater value than the reference luminance difference, the timing controller 132 may determine that the reflected image IM2 in the second image area AR2 may be viewed by the user and may adjust the luminance difference to a value smaller than or equal to the reference luminance difference. The timing controller 132 may adjust the luminance difference by adjusting only the luminance of the second image area AR2.

Figure 4B:
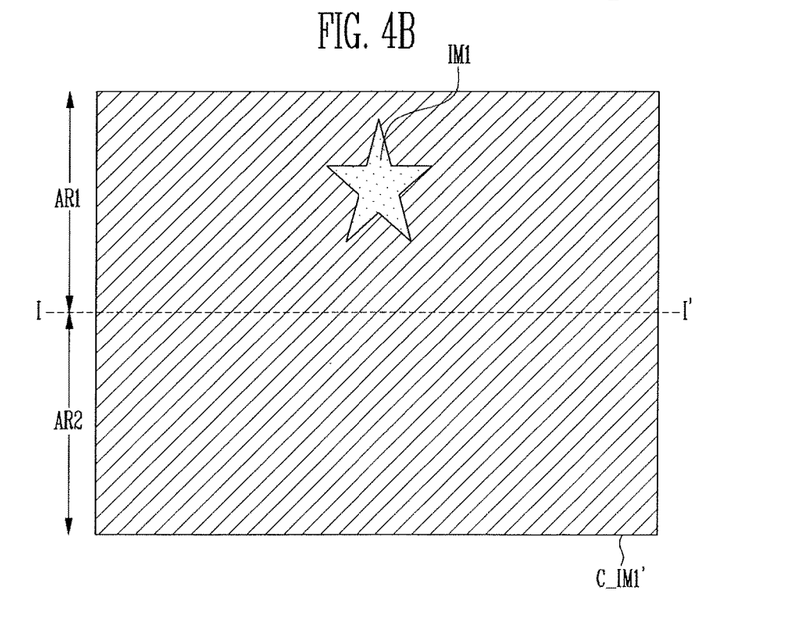

Referring to FIGS. 2, 3, and 4B, a visual image C_IM1' in which the luminance of the second image area AR2 is adjusted by the timing controller 132 is shown. When the displayed image and the reflective image have similar luminances, the user may not easily recognize the reflected image IM2 even though the reflected image IM2 is present. That is, when the second image area AR2 and the reflected image IM2 have similar luminances, the user may not recognize the reflected image IM2. However, when the luminance difference between the first image area AR1 and the second image area AR2 is greater than the reference luminance difference, the timing controller 132 may increase the luminance of the second image area AR2 to prevent the user from visually recognizing the reflected image IM2.

According to an embodiment, the timing controller 132 may adjust the luminance of the second image area AR2 so that a luminance value of the second image area AR2 may decrease toward the center of symmetry I-I', e.g., where these areas are adjacent one another. That is, the luminance of the second image area AR2 may have a higher value away from the center of symmetry center I-I'. Accordingly, a boundary between the first image area AR1 and the second image area AR2 may be prevented from being recognized by the user due to the luminance difference.

According to another embodiment, the timing controller 132 may entirely increase the luminance of the second image area AR2 so that the luminance difference between the first image area AR1 and the second image area AR2 is smaller than or equal to the reference luminance difference.

As described above, when the display device 100 according to an embodiment of the present disclosure adjusts the luminance of the second image area AR2, the user may not recognize the reflected image IM2 despite viewing the visual image C_IM1' including the reflected image IM2.

Figure 5:
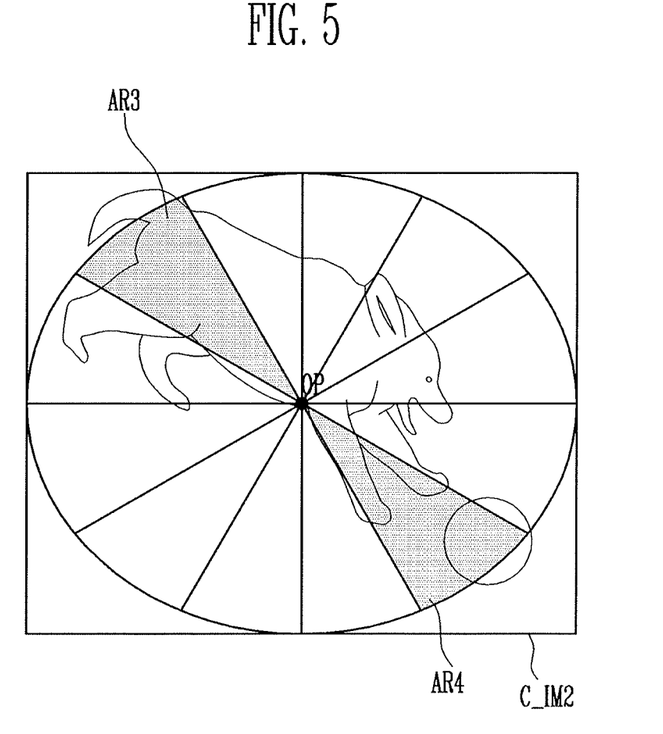
FIG. 5 illustrates a conceptual view of a luminance correction method of a display device according to another embodiment of the present disclosure.

FIG. 5 is a conceptual view illustrating a luminance correction method of a display device according to another embodiment of the present disclosure. Referring to FIG. 5, the display device 100 according to the embodiment of the present disclosure may divide a visual image C_IM2 into image areas symmetrical to each other about the optical axis of the lens, e.g., radial sections of the display device.

The display device 100 may compare luminance of two image areas symmetrical to each other about an optical axis OP of the lens and adjust the luminance of the image area having a relatively lower luminance value, so that the use may not visually recognize the reflected image.

For example, the display device 100 may compare luminance of a third image area AR3 and a fourth image area AR4, which are symmetrical to each other about the optical axis OP of the lens, and adjust luminance of an area having a lower luminance value between the third image area AR3 and the fourth image area AR4, so that the user may not see the reflected image.

As described above, the display device 100 may adjust luminance of each of the image areas symmetrical to each other about the optical axis OP of the lens so that the user may not see the reflected image included in the entire visual image C_IM2.

Figure 6:
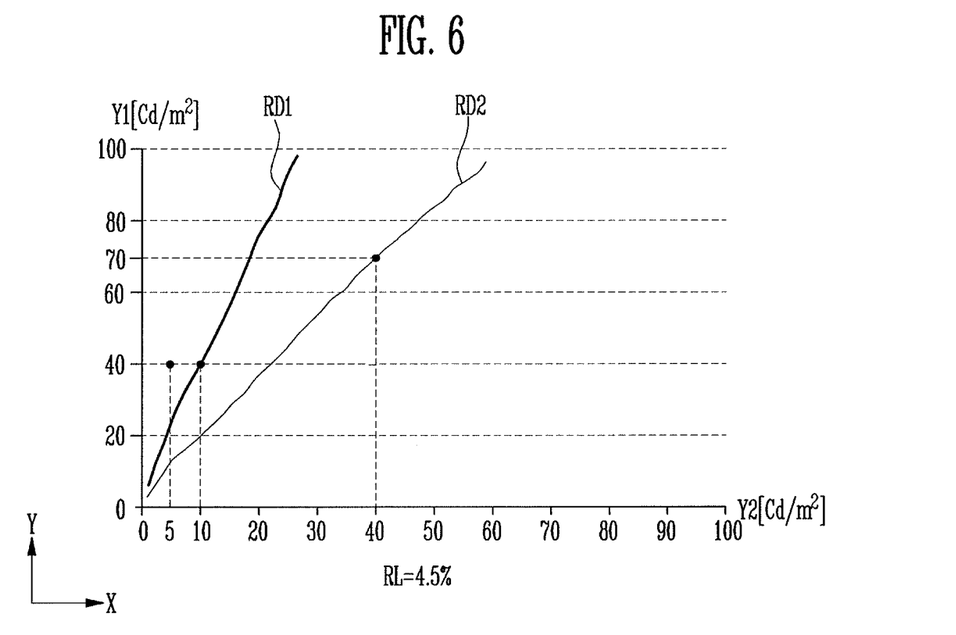
FIG. 6 illustrates a graph showing a method of setting a reference luminance difference corresponding to reflectivity of a display unit by a display device according to an embodiment of the present disclosure.

FIG. 6 is a graph showing a method of setting a reference luminance difference corresponding to reflectivity a display unit according to an embodiment of the present disclosure. Display unit reflectivity graphs RD1 and RD2 shown in FIG. 6 show a reference luminance difference between the display devices 100 having a reflectivity of 10% of the display unit 140 and a reflectivity of 20% of the display unit 140, respectively, when the lens has a reflectivity RL of 4.5%. However, FIG. 6 is only illustratively shown in order to facilitate understanding of the present disclosure, and the present disclosure is not limited thereto.

Referring to FIGS. 1, 2, and 6, the display unit reflectivity graphs RD1 and RD2 show the reference luminance difference by the reflectivity of the display unit 140 according to reflectivity RL of a fixed lens. An x-axis of the graph represents luminance Y2 of the second image area, a y-axis represent luminance Y1 of the first image area, and a reference luminance difference is represented by a difference between a y-axis coordinate value and an x-axis coordinate value. As described above, it is assumed that the first image area AR1 has a higher luminance value than the second image area AR2. In addition, the reflectivity of the display unit 140 may indicate a reflectivity measured by using specularly reflected light.

For example, when the lens of the display device 100 has a reflectivity of 4.5%, the display unit 140 has a reflectivity of 10%, and the luminance Y1 of the first image area determined by using the luminance detection result LI is 40 cd/m$^2$, the display device 100 may determine a difference between a y-axis coordinate value 40 and an x-axis coordinate value 10 of a first display unit reflectivity graph RD1 as a reference luminance difference. That is, the display device 100 may determine the reference luminance difference to be 30 cd/m$^2$.

For example, when the lens of the display device 100 has a reflectivity of 4.5%, the display unit 140 has a reflectivity of 20%, and the luminance Y1 of the first image area determined by using the luminance detection result LI is 70 cd/m$^2$, the display device 100 may determine a difference between a y-axis coordinate value 70 and an x-axis coordinate value 40 of a second display unit reflectivity graph RD2 as a reference luminance difference. That is, the display device 100 may determine the reference luminance difference to be 30 cd/m$^2$.

When the luminance difference between the first image area AR1 and the second image area AR2 is greater than the reference luminance difference, the display device 100 may control the luminance Y2 of the second image area so that the above luminance difference is smaller than or equal to the reference luminance difference.

For example, when the lens of the display device 100 has a reflectivity of 4.5%, the display unit 140 has a reflectivity of 10%, and the luminance of the first image area AR1 determined by using the luminance detection result LI is 40 cd/m$^2$ and the luminance of the second image area AR2 is 5 cd/m$^2$, the luminance difference between the first image area AR1 and the second image area AR2 may be 35 cd/m$^2$. Since a reference luminance difference determined with reference to the first display unit reflectivity graph RD1 is 30 cd/m$^2$, the display device 100 may adjust the above luminance difference to be smaller than or equal to the reference luminance difference by increasing the luminance Y2 of the second image area by more than 5 cd/m².

The reference luminance difference may be stored in the look-up table by the reflectivity of the lens and the reflectivity of the display unit 140.

Figure 7:
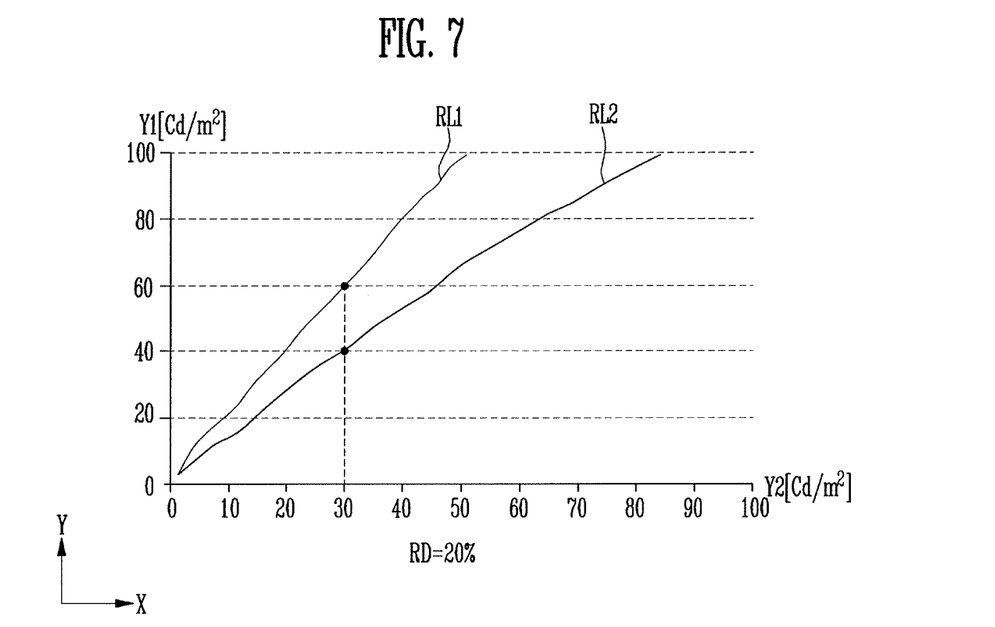
FIG. 7 illustrates a graph showing a method of setting a reference luminance difference corresponding to reflectivity of a lens by a display device according to an embodiment of the present disclosure.

FIG. 7 is a graph showing a method of setting a reference luminance difference corresponding to reflectivity of a lens by a display device according to an embodiment of the present disclosure.

Lens reflectivity graphs RL1 and RL2 shown in FIG. 7 are illustrated for showing a reference luminance difference of lenses of the display devices 100 having a reflectivity of 4% and a reflectivity of 6%, respectively, when the reflectivity of the display unit 140 is 20%. However, the lens reflectivity graphs RL1 and RL2 are illustratively shown in order to facilitate understanding of the present disclosure, but the present disclosure not limited thereto.

Referring to FIGS. 1, 2 and 7, the lens reflectivity graphs RL1 and RL2 show a reference luminance difference by the reflectivity of the lens in accordance with the reflectivity RD of the fixed display unit 140. An x-axis of the graph represents the luminance Y2 of the second image area, a y-axis represents the luminance Y1 of the first image area, and a reference luminance difference is represented the y-axis coordinate value and the x-axis coordinate value. As described above, it is assumed that the first image area AR1 has a higher luminance value than the second image area AR2.

For example, when the display unit 140 of the display device 100 has a reflectivity of 20%, the lens has a reflectivity of 4%, and the luminance Y1 of the first image area determined by using the luminance detection result LI is 60 cd/m², the display device 100 may determine a difference between a y-axis coordinate value 60 and an x-axis coordinate value 30 of the first lens reflectivity graph RL1 as a reference luminance difference. That is, the display device 100 may determine the reference luminance difference to be 30 cd/m².

For example, when the display unit 140 of the display device 100 has a reflectivity of 20%, the lens has a reflectivity of 6%, and the luminance Y1 of the first image area determined by using the luminance detection result LI is 40 cd/m², the display device 100 may determine a difference between the y-axis coordinate value 40 and the x-axis coordinate value 30 of the second lens reflectivity graph RL2 as a reference luminance difference. That is, the display device 100 may determine the reference luminance difference to be 10 cd/m².

A method for correcting the luminance Y2 of the second image area by using the reference luminance difference of the display device 100 in FIG. 7 is the same as a method for correcting the luminance Y2 of the second image area by using the reference luminance difference of the display device 100 in FIG. 6. Thus, the repetition thereof will be omitted.

Figure 8:
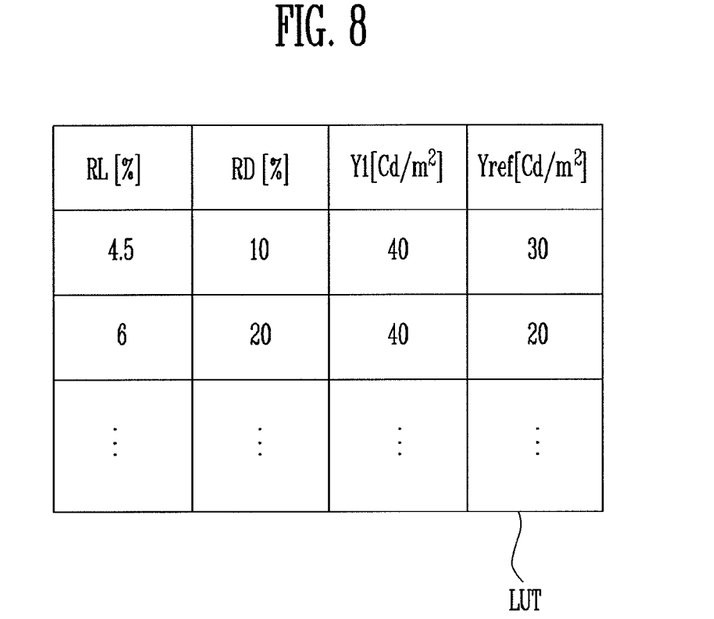
FIG. 8 illustrates a conceptual view of a look-up table according to an embodiment of the present disclosure.

FIG. 8 is a conceptual view illustrating a look-up table according to an embodiment of the present disclosure. Referring to FIGS. 1, 2 and 8, the look-up table LUT may include the reflectivity of the lens, the reflectivity of the display unit 140, the luminance Y1 of the first image area, and a reference luminance difference Yref. The display device 100 may detect the luminance Y1 of the first image area in consideration of the reflectivity of the lens and the reflectivity of the display unit 140 and detect the reference luminance difference Yref according to the luminance detection result LI by using the look-up table LUT.

For example, when the reflectivity of the lens is 4.5%, the reflectivity of a display unit 140 is 10%, and the luminance Y1 of the first image area included in the luminance detection result LI is 40 cd/m², the display device 100 may set the reference luminance difference Yref to be 30/m² by using the look-up table LUT. The look-up table LUT may be stored in the memory 150 and read at the request of the processor 110 or the display driver 130.

Figure 9:
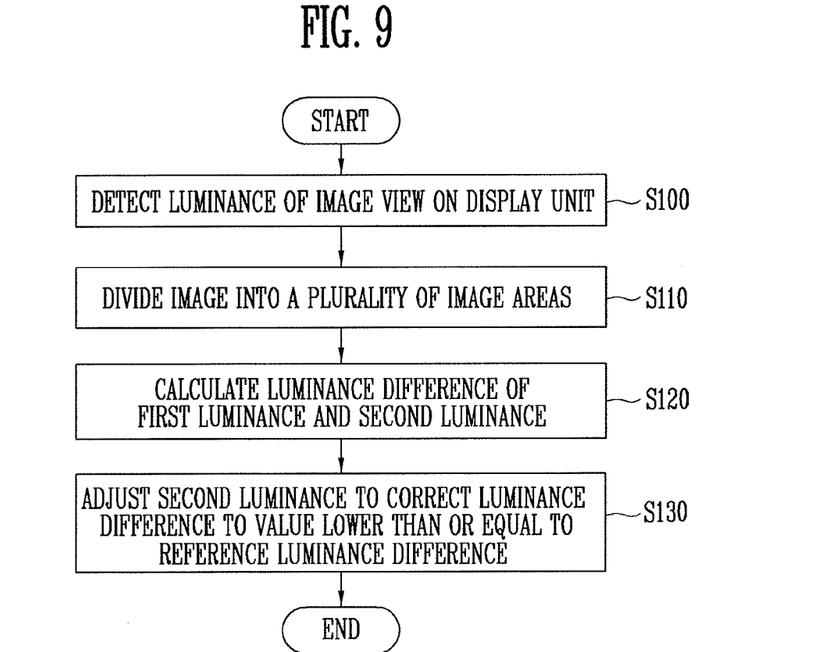
FIG. 9 illustrates a flow chart showing a luminance correction method of a display device according to an embodiment of the present disclosure.

FIG. 9 is a flow chart showing a luminance correction method of a display device according to an embodiment of the present disclosure. Referring to FIGS. 1, 2, and 9, the display device 100 according to an embodiment of the present disclosure may detect luminance of the visual image viewed on the display unit 140 (S100), and divide the visual image into image areas (S110).

The display device 100 may calculate the luminance difference between a first luminance of the first image area AR1 and a second luminance of the second image area AR2 symmetrical to the first image area (S120).

The display device 100 may adjust the second luminance having a lower luminance value than the first luminance so as to adjust the above luminance difference to a value smaller than or equal to the reference luminance difference included in the look-up table LUT (S130).

According to such a luminance correcting method, the display device 100 may prevent the user from seeing the second image included in the visual image (S130).

According to a display device and a luminance correction method thereof according to the embodiment of the present disclosure, an image viewed on the display unit may be divided into image areas symmetrical to each other, and the luminance difference between the image areas may be adjusted to be smaller than or equal to a reference luminance difference, thereby preventing the user from viewing the undesired second image.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
   a display unit including a plurality of pixels to display a display image;
   a luminance detector to detect luminance of an image on the display unit;
   a display driver to divide the display unit into image areas symmetrical to each other and to adjust a luminance of an image area having a relatively lower luminance value between the image areas symmetrical to each other based on a luminance detection result; and
   a lens unit including a lens to focus the image on an eyeball of a user.

2. The display device as claimed in claim 1, wherein the image includes the display image and a reflected image reflected by the lens.

3. The display device as claimed in claim 1, wherein the display driver is to divide the image into the image areas to be symmetrical to each other about an optical axis of the lens.

4. The display device as claimed in claim 1, wherein the display driver is to:
calculate a luminance difference between a first luminance of a first image area in which the image is displayed and a second luminance of a second image area symmetrical to the first image area among the image areas; and
adjust the second luminance so that the luminance difference is less than a reference luminance difference included in a look-up table, and
wherein the second luminance is less than the first luminance.

5. The display device as claimed in claim 4, wherein the display driver is to gradually increase the second luminance so that the second luminance decreases toward a center of symmetry in the second image area.

6. The display device as claimed in claim 4, wherein the display driver is to increase the second luminance of an entirety of the second image area.

7. The display device as claimed in claim 4, wherein the reference luminance difference is set to correspond to reflectivity of the lens.

8. The display device as claimed in claim 4, wherein the reference luminance difference is set based on reflectivity of the display unit.

9. The display device as claimed in claim 4, wherein the look-up table includes reflectivity of the display unit, reflectivity of the lens, and the reference luminance difference.

10. A display device, comprising:
a display unit including a plurality of pixels to display a display image;
a luminance detector to detect luminance of an image on the display unit; and
a display driver to divide the display unit into image areas symmetrical to each other and to adjust a luminance of an image area having a relatively lower luminance value between the image areas symmetrical to each other based on a luminance detection result, wherein the display driver is to adjust luminances of the image areas so that luminance differences between image areas symmetrical to each other are less than a reference luminance difference.

11. A method of correcting luminance of a display device to display a display image, the method comprising:
detecting luminance of an image on a display unit;
dividing the image into image areas symmetrical to each other;
calculating a luminance difference between the image areas; and
adjusting a luminance of an image area having a relatively lower luminance value among the image areas symmetrical to each other based on the luminance difference, wherein dividing the image includes dividing the image into the image areas that are symmetrical to each other about an optical axis of a lens focusing the image on an eyeball of a user.

12. The method as claimed in claim 11, wherein the image areas include a first image area in which the image is displayed having a first luminance and a second image area having a second luminance less than the first luminance.

13. The method as claimed in claim 12, wherein adjusting the luminance includes gradually increasing the second luminance in the second image area so that the second luminance increases away from a center of symmetry in the second image area.

14. The method as claimed in claim 12, wherein adjusting the luminance includes increasing the second luminance over an entirety of the second image area.

15. The method as claimed in claim 11, wherein adjusting the luminance includes adjusting luminances so that luminance differences between image areas symmetrical to each other are less than a reference luminance difference.

16. The method as claimed in claim 15, wherein the reference luminance difference is stored in a look-up table that includes reflectivity of the display unit and reflectivity of a lens focusing the image on the eyeball of the user.

* * * * *